United States Patent
Drake et al.

(10) Patent No.: US 6,954,930 B2
(45) Date of Patent: Oct. 11, 2005

(54) REMOTE VALIDATION OF INSTALLATION INPUT DATA

(75) Inventors: Daniel R. Drake, Apex, NC (US); Robert C. Sizemore, Fuquay-Varina, NC (US)

(73) Assignee: International Business Machines Corporation, Armonk, NY (US)

( * ) Notice: Subject to any disclaimer, the term of this patent is extended or adjusted under 35 U.S.C. 154(b) by 633 days.

(21) Appl. No.: 10/079,302

(22) Filed: Feb. 19, 2002

(65) Prior Publication Data

US 2003/0159137 A1 Aug. 21, 2003

(51) Int. Cl.[7] ............... G06F 9/445; G06F 15/16; G06F 15/177
(52) U.S. Cl. ............... 717/178; 709/219; 709/220
(58) Field of Search ............... 717/174–178; 715/513; 709/217–222

(56) References Cited

U.S. PATENT DOCUMENTS

| | | | | |
|---|---|---|---|---|
| 5,845,078 A | * | 12/1998 | Tezuka et al. | 709/222 |
| 5,881,236 A | * | 3/1999 | Dickey | 709/221 |
| 5,931,909 A | * | 8/1999 | Taylor | 709/221 |
| 5,950,010 A | * | 9/1999 | Hesse et al. | 717/178 |
| 6,067,582 A | * | 5/2000 | Smith et al. | 710/5 |
| 6,202,206 B1 | * | 3/2001 | Dean et al. | 717/177 |
| 6,223,345 B1 | * | 4/2001 | Jones et al. | 717/100 |
| 6,282,711 B1 | * | 8/2001 | Halpern et al. | 717/175 |
| 6,665,867 B1 | * | 12/2003 | Ims et al. | 717/173 |
| 6,725,453 B1 | * | 4/2004 | Lucas et al. | 717/178 |
| 6,775,829 B1 | * | 8/2004 | Kroening | 717/175 |
| 2003/0078949 A1 | * | 4/2003 | Scholz et al. | 707/505 |
| 2003/0140128 A1 | * | 7/2003 | Cox et al. | 709/221 |

\* cited by examiner

*Primary Examiner*—Anil Khatri
*Assistant Examiner*—Trent J. Roche
(74) *Attorney, Agent, or Firm*—Marcia L. Doubet

(57) ABSTRACT

Methods, systems, and computer program products for improving installation of software packages by performing dynamic, remote validation of various installation data before building an installation image. The remote validation occurs in the target environment, such that the values for various installation parameters can be analyzed in the context of that target environment. Creation and distribution of the installation package can then be suppressed until the configuration parameters have acceptable values. This immediate feedback approach allows for a more efficient installation process. In preferred embodiments, structured markup language syntax is used to specify which configuration values are subject to remote validation. Structured markup language documents are preferably used to describe the data that is to be transmitted from a staging server to the remote environment, where an installation agent is adapted for processing the document and determining the corresponding validation routine(s) to be invoked on the remote system. Similarly, structured markup language documents are preferably used for describing results of the validation to the staging server.

30 Claims, 9 Drawing Sheets

FIG. 5

```
{"product_vendor", "IBM"},
{"product_name", "DB2 Universal Database Run-Time Client"},
{"product_description", "<html>Provide the following information and click
<b>Finish</b> to proceed.<br>Click a field name for additional information about the
field.</html>"},
{"product_icon", "com/ibm/cbf/icons/db2.gif"},
{"files_DB2RTClient71Win_prompt_string", "Specify the location of the install image for this product
(for example, the CD-ROM drive or mount point)"},
{"jar_name", "CBN_db2rtclientwin"},
```

FIG. 6

```
{"value_DB2_Runtime_Client_prod_path_keyword", "FILE"},
{"value_DB2_Runtime_Client_prod_path_section", ""},
{"var_DB2_Runtime_Client_prod_path_minimum_length", "3"},
{"var_DB2_Runtime_Client_prod_path_mnemonic", "D"},
{"var_DB2_Runtime_Client_prod_path_help_text", "The directory where you want to install the application files."},
{"var_DB2_Runtime_Client_prod_path_label_text", "Destination Directory"},
{"value_DB2_Runtime_Client_prod_path", "C:\\SQLLIB"},
```

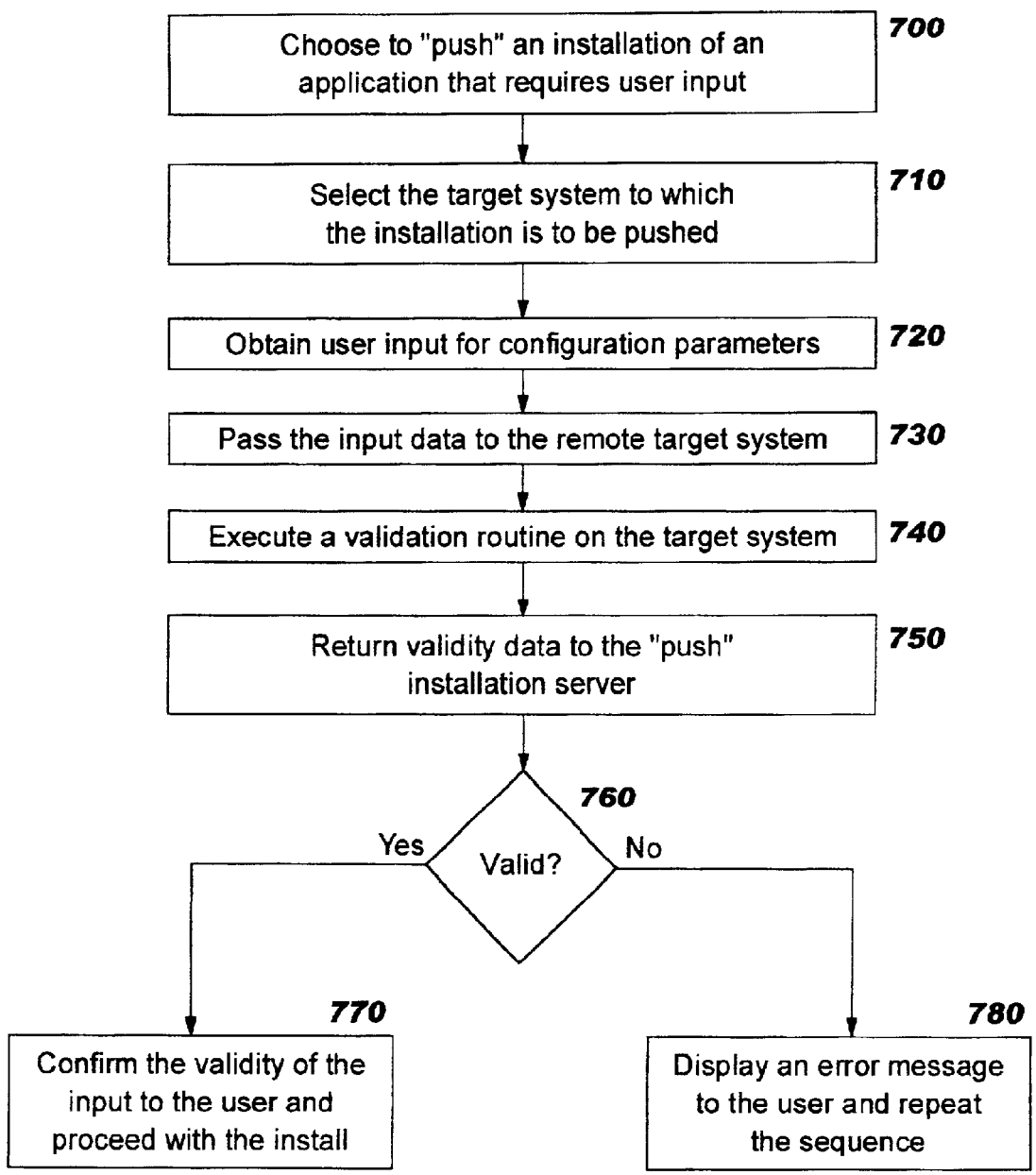

FIG. 8A

| FIG. 8A |
|---------|
| FIG. 8B |

810 <stringVariable
         name="IBMHTTPW32win_prod_path"
811   minimumLength="4">
         <labelText translatedKey="prodPathLabel"/>
         <helpText translatedKey="prodPathHelp"/>
         <issFileAssociation
            responseFileName="IHSSetup.iss"
            section="SdAskDestPath-0"
            keyword="szDir">
            <defaultData>C:\IBM HTTP Server</defaultData>
         </issFileAssociation>
812   <validator>com.ibm.jsdt.common.W32InputTester</validator>
       </stringVariable>

820 <stringVariable
         name="IHS_SERVER_USERID"
821   minimumLength="2" maximumLength="20" upperCase="false" lowerCase="true">
         <labelText translatedKey="userIdLabel"/>
         <helpText translatedKey="userIdHelp"/>
         <issFileAssociation
            responseFileName="IHSSetup.iss"
            section="UserID-0"
            keyword="szEdit1">
            <defaultData>Administrator</defaultData>
         </issFileAssociation>
       </stringVariable>

830 <passwordVariable
         name="IHS_SERVER_PASSWORD"
831   minimumLength="2" maximumLength="20" upperCase="false" lowerCase="true">
         <labelText translatedKey="passwordLabel"/>
         <helpText translatedKey="passwordHelp"/>
         <issFileAssociation
            responseFileName="IHSSetup.iss"
            section="UserID-0"
            keyword="szEdit2">
            <defaultData></defaultData>
         </issFileAssociation>
       </passwordVariable>

FIG. 8B

```
840  <stringVariable
        name="IHS_PORT_NUMBER"
841     minimumLength="1"
        maximumLength="5">
       <labelText>HTTP Port Number </labelText>
       <helpText>The port to which the standalone server listens. For port numbers
          less than 1023, you will need httpd to be run as root initially.</helpText>
       <propertiesAssociation
        keyword="IHS.PORT_NUMBER">
         <defaultData>80</defaultData>
       </propertiesAssociation>
       <inputValidation>
         <valid>
842        <characters>0123456789</characters>
           <range>1 to 65535</range>
         </valid>
         <invalid/>
       </inputValidation>
     </stringVariable>

850  <remoteValidation>
851    <portNumber>IHS_PORT_NUMBER</portNumber>
852    <prodPath>IBMHTTPW32win_prod_path</prodPath>
853    <userID>IHS_SERVER_USERID</userID>
     </remoteValidation>
```

REMOTE VALIDATION OF INSTALLATION INPUT DATA

RELATED INVENTION

The present invention is related to U.S. Pat. No. Ser. No. 09/669,227, filed Sep. 25, 2000, titled "Object Model and Framework for Installation of Software Packages Using JavaBeans™"; U.S. Pat. No. Ser. No. 09/707,656, filed Nov. 7, 2000, titled "Object Model and Framework for Installation of Software Packages Using Object Descriptors"; U.S. Pat. No. Ser. No. 09/707,545, filed Nov. 7, 2000, titled "Object Model and Framework for Installation of Software Packages Using Object REXX"; U.S. Pat. No. Ser. No. 09/707,700, filed Nov. 7, 2000, titled "Object Model and Framework for Installation of Software Packages Using Structured Documents"; U.S. Pat. No. Ser. No. 09/879,694, filed Jun. 12, 2001, titled "Efficient Installation of Software Packages"; and U.S. Pat. No. Ser. No. 09/974,688, filed Oct. 10, 2001, titled "Self-Contained Validation of Data Model Object Content". These inventions are commonly assigned to the International Business Machines Corporation ("IBM") and are hereby incorporated herein by reference.

BACKGROUND OF THE INVENTION

1. Field of the Invention

The present invention relates to a computer system, and deals more particularly with methods, systems, and computer program products for improving the installation of software packages by performing a remote validation of various installation data before creating an installation image which reflects that installation data.

2. Description of the Related Art

Use of computers in today's society has become pervasive. The software applications to be deployed, and the computing environments in which they will operate, range from very simple to extremely large and complex. The computer skills base of those responsible for installing the software applications ranges from novice or first-time users, who may simply want to install a game or similar application on a personal computer, to experienced, highly-skilled system administrators with responsibility for large, complex computing environments. The process of creating a software installation package that is properly adapted to the skills of the eventual installer, as well as to the target hardware and software computing environment, and also the process of performing the installation, can therefore be problematic.

In recent decades, when the range of computing environments and the range of user skills was more constant, it was easier to target information on how software should be installed. Typically, installation manuals were written and distributed with the software. These manuals provided textual information on how to perform the installation of a particular software application. These manuals often had many pages of technical information, and were therefore difficult to use by those not having considerable technical skills. "User-friendliness" was often overlooked, with the description of the installation procedures focused solely on the technical information needed by the software and system.

With the increasing popularity of personal computers came a trend toward easier, more user-friendly software installation, as software vendors recognized that it was no longer reasonable to assume that a person with a high degree of technical skill would be performing every installation process. However, a number of problem areas remained because of the lack of a standard, consistent approach to software installation across product and vendor boundaries. These problems, which are addressed in the related inventions, will now be described.

The manner in which software packages are installed today, and the formats of the installation images, often varies widely depending on the target platform (i.e. the target hardware, operating system, etc.), the installation tool in use, and the underlying programming language of the software to be installed, as well as the natural language in which instructions are provided and in which input is expected. When differences of these types exist, the installation process often becomes more difficult, leading to confusion and frustration for users. For complex software packages to be installed in large computing systems, these problems are exacerbated. In addition, developing software installation packages that attempt to meet the needs of many varied target environments (and the skills of many different installers) requires a substantial amount of time and effort.

One area where consistency in the software installation process is advantageous is in knowing how to invoke the installation procedure. Advances in this area have been made in recent years, such that today, many software packages use some sort of automated, self-installing procedure. For example, a file (which, by convention, is typically named "setup.exe" or "install.exe") is often provided on an installation medium (such as a diskette or CD-ROM). When the installer issues a command to execute this file, an installation program begins. Issuance of the command may even be automated in some cases, whereby simply inserting the installation medium into a mechanism such as a CD-ROM reader automatically launches the installation program.

These automated techniques are quite beneficial in enabling the installer to get started with an installation. However, there are a number of other factors which may result in a complex installation process, especially for large-scale applications that are to be deployed in enterprise computing environments. For example, there may be a number of parameters that require input during installation of a particular software package. Arriving at the proper values to use for these parameters may be quite complicated, and the parameters may even vary from one target machine to another. There may also be a number of prerequisites and/or co-requisites, including both software and hardware specifications, that must be accounted for in the installation process. There may also be issues of version control to be addressed when software is being upgraded. An entire suite or package of software applications may be designed for simultaneous installation, leading to even more complications. In addition, installation procedures may vary widely from one installation experience to another, and the procedure used for complex enterprise software application packages may be quite different from those used for consumer-oriented applications.

Furthermore, these factors also affect the installation package developers, who must create installation packages which properly account for all of these variables. Prior art installation packages are often created using vendor-specific and product-specific installation software. Adding to or modifying an installation package can be quite complicated, as it requires determining which areas of the installation source code must be changed, correctly making the appropriate changes, and then recompiling and retesting the installation code. End-users may be prevented from adding to or modifying the installation packages in some cases, limiting the adaptability of the installation process. The lack of a standard, robust product installation interface therefore results in a labor-intensive and error-prone installation package development procedure.

Other practitioners in the art have recognized the need for improved software installation techniques. In one approach, generalized object descriptors have been adapted for this purpose. An example is the Common Information Model (CIM) standard promulgated by The Open Group™ and the Desktop Management Task Force (DTMF). The CIM standard uses object descriptors to define system resources for purposes of managing systems and networks according to an object-oriented paradigm. However, the object descriptors which are provided in this standard are very limited, and do not suffice to drive a complete installation process. In another approach, system management functions such as Tivoli® Software Distribution, Computer Associates Unicenter TNG®, Intel LANDesk® Management Suite, and Novell ZENWorks™ for Desktops have been used to provide a means for describing various packages for installation. Unfortunately, these descriptions lack cross-platform consistency, and are dependent on the specific installation tool and/or system management tool being used. In addition, the descriptions are not typically or consistently encapsulated with the install image, leading to problems in delivering bundle descriptions along with the corresponding software bundle, and to problems when it is necessary to update both the bundle and the description in a synchronized way. (The CIM standard is described in "Systems Management: Common Information Model (CIM)", Open Group Technical Standard, C804 ISBN 1-85912-255-8, August 1998. "Tivoli" is a registered trademark of Tivoli Systems Inc. "Unicenter TNG" is a registered trademark of Computer Associates International, Inc. "LANDesk" is a registered trademark of Intel Corporation. "ZENWorks" is a trademark of Novell, Inc.)

The related inventions teach use of an object model and framework for software installation packages and address many of these problems of the prior art, enabling the installation process to be simplified for software installers as well as for the software developers who must prepare their software for an efficient, trouble-free installation, and define several techniques for improving installation of software packages. While the techniques disclosed in the related inventions provide a number of advantages and are functionally sufficient, there may be some situations in which the techniques disclosed therein may be improved upon.

SUMMARY OF THE INVENTION

An object of the present invention is to provide an improved technique for installation of software packages.

It is another object of the present invention to provide this technique using a model and framework that provides for a consistent and efficient installation across a wide variety of target installation environments, where a remote validation process is used to validate installation data to be used in creating the installation package.

Another object of the present invention is to provide a software installation technique that only packages and downloads objects created according to that model and framework to a target machine after selected installation values have been remotely validated.

Still another object of the present invention is to provide the improved software installation technique wherein various installation parameters related to a target environment are remotely validated, in the context of the target environment, prior to creation of an installation package.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides methods, systems, and computer program products for improving installation of software packages by performing a remote validation of various installation data before building an installation image. In one aspect, this technique comprises: obtaining input values corresponding to one or more installation parameters of an installation package; determining one or more of the installation parameters which are subject to remote validation; transmitting the obtained input values corresponding to the determined installation parameters to a remotely-located system for the remote validation; and using a result of the remote validation when building the installation package.

The determining preferably further comprises consulting a specification of which of the installation parameters are subject to remote validation, where this specification is preferably encoded in a structured markup language (such as the Extensible Markup Language, "XML", or a derivative thereof). The transmitted input parameters and/or the result of the remote validation may also be encoded in a structured markup language. The specification may be part of an installation object defined for the installation package.

The technique may further comprise: receiving, at the remotely-located system, the transmitted input values; performing the remote validation of the received input values; and returning the result of the remote validation. In this case, performing the remote validation preferably further comprises identifying one or more remote validation routines corresponding to the received input values. Typically, this identification is performed by an installation agent resident on the remotely-located system.

Using the result of the remote validation preferably further comprises building the installation package if the result if positive, and repeating operation of the obtaining, transmitting, and using steps otherwise. When the installation package is built, it preferably reflects one or more of the obtained input values.

According to preferred embodiments, the remote validation is performed in context of the remotely-located system, using information that is locally-available on the remotely-located system.

The technique may further comprise transmitting the built installation package to the remotely-located system, as well as receiving the transmitted installation package at the remotely-located system and installing the received installation package.

The present invention will now be described with reference to the following drawings, in which like reference numbers denote the same element throughout.

BRIEF DESCRIPTION OF THE DRAWINGS

FIGS. 5 and 6 depict resource bundles that may be used for specifying various types of product and variable information to be used during an installation, according to an embodiment of the related inventions;

FIG. 7 depicts a flowchart illustrating logic with which installation data for a software installation package may be remotely validated, according to preferred embodiments of the present invention; and FIG. 8 provides a sample structured markup language document showing how the data to be validated may be identified, according to preferred embodiments of the present invention.

DESCRIPTION OF PREFERRED EMBODIMENTS

Figure 1:
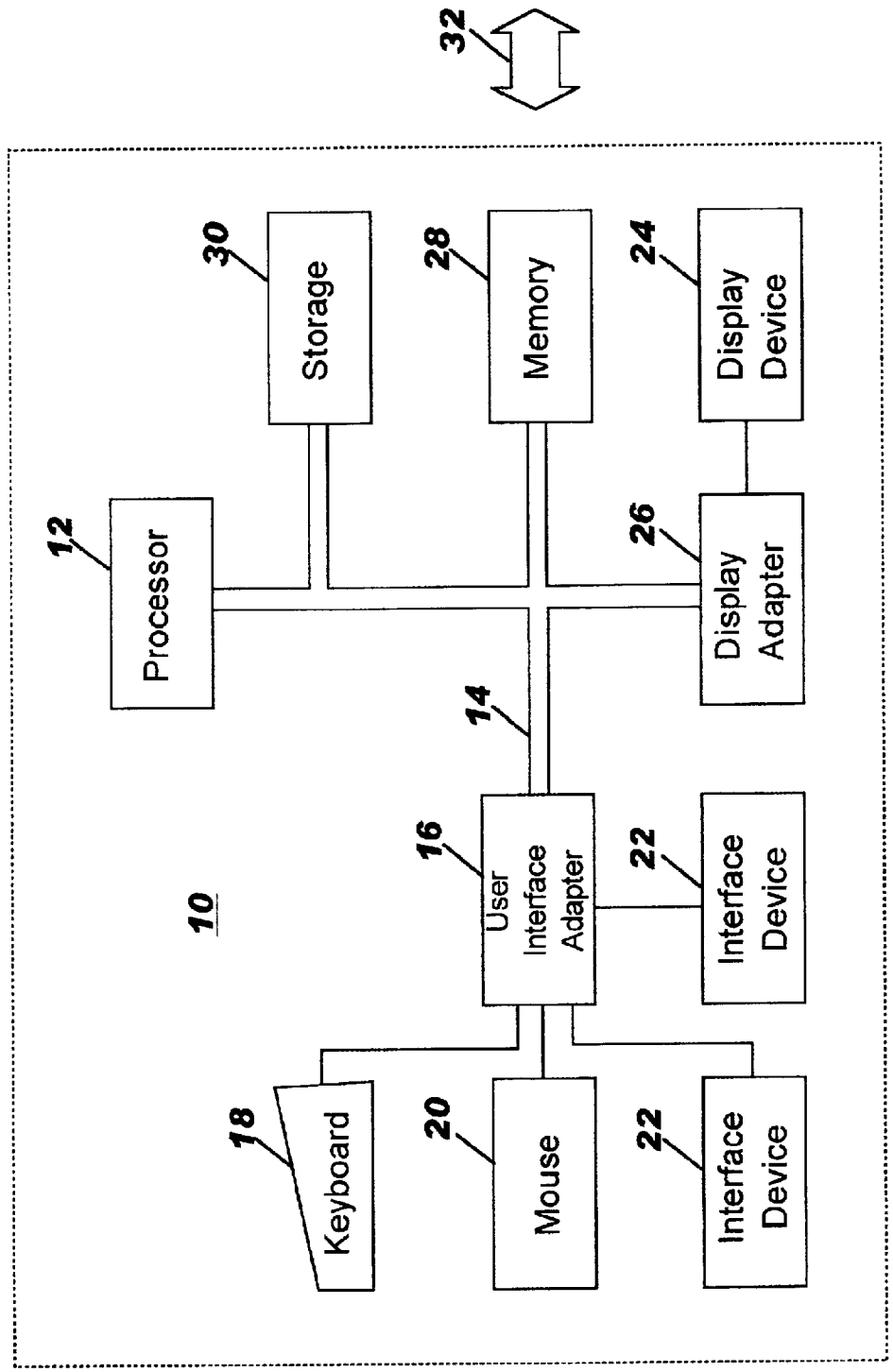
FIG. 1 is a block diagram of a computer hardware environment in which the present invention may be practiced.

FIG. 1 illustrates a representative computer hardware environment in which the present invention may be practiced. The device 10 illustrated therein may be a personal computer, a laptop computer, a server or mainframe, and so forth. The device 10 typically includes a microprocessor 12 and a bus 14 employed to connect and enable communication between the microprocessor 12 and the components of the device 10 in accordance with known techniques. The device 10 typically includes a user interface adapter 16, which connects the microprocessor 12 via the bus 14 to one or more interface devices, such as a keyboard 18, mouse 20, and/or other interface devices 22 (such as a touch sensitive screen, digitized entry pad, etc.). The bus 14 also connects a display device 24, such as an LCD screen or monitor, to the microprocessor 12 via a display adapter 26. The bus 14 also connects the microprocessor 12 to memory 28 and long-term storage 30 which can include a hard drive, diskette drive, tape drive, etc.

The device 10 may communicate with other computers or networks of computers, for example via a communications channel or modem 32. Alternatively, the device 10 may communicate using a wireless interface at 32, such as a CDPD (cellular digital packet data) card. The device 10 may be associated with such other computers in a local area network (LAN) or a wide area network (WAN), or the device 10 can be a client in a client/server arrangement with another computer, etc. All of these configurations, as well as the appropriate communications hardware and software which enable their use, are known in the art.

Figure 2:
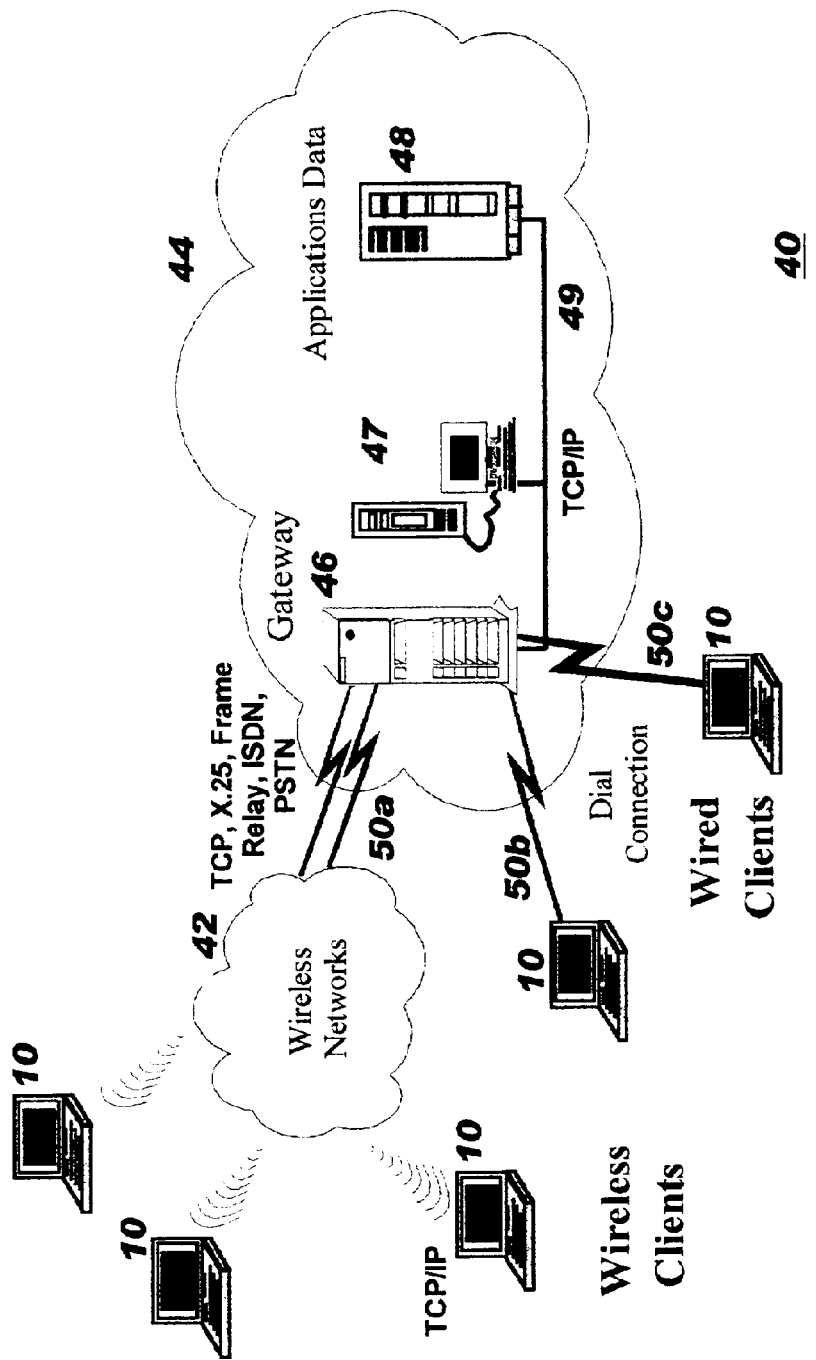
FIG. 2 is a diagram of a networked computing environment in which the present invention may be practiced.

FIG. 2 illustrates a data processing network 40 in which the present invention may be practiced. The data processing network 40 may include a plurality of individual networks, such as wireless network 42 and network 44, each of which may include a plurality of devices 10. Additionally, as those skilled in the art will appreciate, one or more LANs may be included (not shown), where a LAN may comprise a plurality of intelligent workstations or similar devices coupled to a host processor.

Still referring to FIG. 2, the networks 42 and 44 may also include mainframe computers or servers, such as a gateway computer 46 or application server 47 (which may access a data repository 48). A gateway computer 46 serves as a point of entry into each network 44. The gateway 46 may be coupled to another network 42 by means of a communications link 50a. The gateway 46 may also be directly coupled to one or more devices 10 using a communications link 50b, 50c. Further, the gateway 46 may be indirectly coupled to one or more devices 10. The gateway computer 46 may also be coupled 49 to a storage device (such as data repository 48). The gateway computer 46 may be implemented utilizing an Enterprise Systems Architecture/370™ computer available from IBM, an Enterprise Systems Architecture/390® computer, etc. Depending on the application, a midrange computer, such as an Application System/400® (also known as an AS/400®) may be employed. ("Enterprise Systems Architecture/370" is a trademark of IBM; "Enterprise Systems Architecture/390", "Application System/400", and "AS/400" are registered trademarks of IBM.)

Those skilled in the art will appreciate that the gateway computer 46 may be located a great geographic distance from the network 42, and similarly, the devices 10 may be located a substantial distance from the networks 42 and 44. For example, the network 42 may be located in California, while the gateway 46 may be located in Texas, and one or more of the devices 10 may be located in New York. The devices 10 may connect to the wireless network 42 using a networking protocol such as the Transmission Control Protocol/Internet Protocol ("TCP/IP") over a number of alternative connection media, such as cellular phone, radio frequency networks, satellite networks, etc. The wireless network 42 preferably connects to the gateway 46 using a network connection 50a such as TCP or UDP (User Datagram Protocol) over IP, X.25, Frame Relay, ISDN (Integrated Services Digital Network), PSTN (Public Switched Telephone Network), etc. The devices 10 may alternatively connect directly to the gateway 46 using dial connections 50b or 50c. Further, the wireless network 42 and network 44 may connect to one or more other networks (not shown), in an analogous manner to that depicted in FIG. 2.

In preferred embodiments, the present invention is implemented in software. Software programming code which embodies the present invention is typically accessed by the microprocessor 12 (e.g. of device 10 and/or server 47) from long-term storage media 30 of some type, such as a CD-ROM drive or hard drive. The software programming code may be embodied on any of a variety of known media for use with a data processing system, such as a diskette, hard drive, or CD-ROM. The code may be distributed on such media, or may be distributed from the memory or storage of one computer system over a network of some type to other computer systems for use by such other systems. Alternatively, the programming code may be embodied in the memory 28, and accessed by the microprocessor 12 using the bus 14. The techniques and methods for embodying software programming code in memory, on physical media, and/or distributing software code via networks are well known and will not be further discussed herein.

A user of the present invention (e.g. a software installer or a software developer creating a software installation package) may connect his computer to a server using a wireline connection, or a wireless connection. Wireline connections are those that use physical media such as cables and telephone lines, whereas wireless connections use media such as satellite links, radio frequency waves, and infrared waves. Many connection techniques can be used with these various media, such as: using the computer's modem to establish a connection over a telephone line; using a LAN card such as Token Ring or Ethernet; using a cellular modem to establish a wireless connection; etc. The user's computer may be any type of computer processor, including laptop, handheld or mobile computers; vehicle-mounted devices; desktop computers; mainframe computers; etc., having processing capabilities (and communication capabilities, when the device is network-connected). The remote server, similarly, can be one of any number of different types of computer which have processing and communication capabilities. These techniques are well known in the art, and the hardware devices and software which enable their use are readily available. Hereinafter, the user's computer will be referred to equivalently as a "workstation", "device", or "computer", and use of any of these terms or the term "server" refers to any of the types of computing devices described above.

When implemented in software, the present invention may be implemented as one or more computer software programs. The software is preferably implemented using an object-oriented programming language, such as the Java™ programming language. The model which is used for describing the aspects of software installation packages is preferably designed using object-oriented modeling techniques of an object-oriented paradigm. In preferred embodiments, the objects which are based on this model, and which are created to describe the installation aspects of a particular installation package, may be specified using a number of approaches, including but not limited to: JavaBeans™ or objects having similar characteristics; structured markup language documents (such as XML documents); object descriptors of an object modeling notation; or Object REXX or objects in an object scripting language having similar characteristics. ("Java" and "JavaBeans" are trademarks of Sun Microsystems, Inc.) For purposes of illustration and not of limitation, the following description of preferred embodiments refers to objects which are JavaBeans.

An implementation of the present invention may be executing in a Web environment, where software installation packages are downloaded using a protocol such as the HyperText Transfer Protocol (HTTP) from a Web server to one or more target computers which are connected through the Internet. Alternatively, an implementation of the present invention may be executing in other non-Web networking environments (using the Internet, a corporate intranet or extranet, or any other network) where software packages are distributed for installation using techniques such as Remote Method Invocation ("RMI") or Common Object Request Broker Architecture ("CORBA"). Configurations for the environment include a client/server network, as well as a multi-tier environment. A software developer or software installer who prepares a software package for installation using the present invention may use a network-connected workstation, or any other similar computing device. These environments and configurations are well known in the art.

The target devices with which the present invention may be used advantageously include end-user workstations, mainframes or servers on which software is to be loaded, or any other type of device having computing or processing capabilities (including "smart" appliances in the home, cellular phones, personal digital assistants or "PDAs", dashboard devices in vehicles, etc.).

Preferred embodiments of the present invention will now be discussed in more detail with reference to FIGS. 3 through 8.

Preferred embodiments of the present invention use an object model for software package installation, in which a framework is defined for creating one or more objects which comprise each software installation package. The present invention discloses techniques for remotely validating installation data to be used when building a software package according to this model and framework. These remote validation techniques will be described in more detail herein. Preferred embodiments of the software object model and framework are described in the related inventions. (In alternative embodiments, the techniques disclosed herein may be used with software installation packages adhering to models/frameworks other than those of the related inventions.)

As disclosed in the related inventions, each installation object preferably comprises object attributes and methods for the following:

1) A manifest, or list, of the files comprising the software package to be installed.

2) Information on how to access the files comprising the software package. This may involve:

a) explicit encapsulation of the files within the object, or b) links that direct the installation process to the location of the files (which may optionally include a specification of any required access protocol, and of any compression or unwrapping techniques which must be used to access the files).

3) Default response values to be used as input for automatically responding to queries during customized installs, where the default values are preferably specified in a response file. The response file may specify information such as how the software package is to be subset when it is installed, where on the target computer it is to be installed, and other values to customize the behavior of the installation process.

4) Methods, usable by a systems administrator or other software installation personnel, for setting various response values or for altering various ones of the default response values to tailor a customized install.

5) Validation methods to ensure the correctness and internal consistency of a customization and/or of the response values otherwise provided during an installation. (Note, however, that the validation techniques disclosed in the related inventions pertain to local validation of installation data, whereas the present invention discloses techniques for remote validation. The related invention titled "Efficient Installation of Software Packages", referred to hereinafter as "the conditional installation invention", further discloses that validation code may be included in an installation package to control an incremental conditional installation process. Distinctions between these related inventions and the present invention will be discussed in more detail below.)

6) Optionally, localizable strings (i.e. textual string values that may be translated, if desired, in order to present information to the installer in his preferred natural language).

7) Instructions (referred to herein as the "command line model") on how the installation program is to be invoked, and preferably, how return code information or other information related to the success or failure of the installation process may be obtained.

8) The capabilities of the software package (e.g. the functions it provides).

9) A specification of the dependencies, including prerequisite or co-requisites, of the software package (such as the required operating system, including a particular level thereof; other software functions that must be present if this package is to be installed; software functions that cannot be present if this package is installed; etc.).

The related inventions have described several of the challenges which are presented when performing installation of complex software packages. Additional problems may arise when those packages are configured for installation and are then distributed over a network for remote installation, using what is sometimes termed a "push" installation. In the prior art push installation model, a user typically interacts with a graphical user interface ("GUI") display at the local staging server (i.e. the server from which the software application is being distributed for remote installation) to provide a number of configuration values. (This user may be a software developer, a software installer, a systems administrator, etc. References hereinafter to a user include any of these various types of people.) The configuration values provided by the installer are then reflected in the installation image which is being built, and that image is then downloaded to the target machine (or machines). After distributing a remote installation program and invoking its installation, the installer typically has to wait for installation status information to determine validity of the configuration input. This prior art process can undermine the benefits of remote installation.

Examples of configuration values that may be supplied for use during the installation image creation process include a user name (other similar identifier, referred to hereinafter as a "user ID") to be used when accessing the remote system, a user password, a destination directory where the software should be stored on the target machine, and a port number for the software application to use. A particular installation may require one or more of these types of configuration values (and as will be obvious, these are merely examples of configuration values that might be provided for a remote installation). Validation of the supplied configuration input data is crucial to the success of the installation.

Prior art implementations of programmatic validation of user input are typically limited to information that is available locally at the staging server. This locally available information is normally limited to syntactic validations. As one example, the validation performed for a user's password may comprise ensuring that the minimum and maximum length constraints have been met. Generic syntax checking may also be performed, in order to ensure that the entered data is of the correct data type (i.e. consisting of digits, characters, or a mix thereof, as appropriate for a particular configuration value). A user ID might be further validated from the local system by consulting a registry of authorized users. As another example, validation of the value provided for the target directory on the remote device is typically limited to ensuring that a drive letter is provided, along with optional additional path syntax that may be checked to ensure that it does not contain any prohibited special characters. And as yet another example, validation of the port number on which the software application will be configured to run is typically limited to ensuring that a numeric value within the range of (0 . . . 65,535) has been provided.

The present invention discloses techniques for dynamic, programmatic validation of user input, where this validation is carried out on the remote machine (under direction of the local staging server). Accordingly, the creation of the installation image is not carried out until the remote validation indicates that the user input is valid. The validation comprises determining whether the user input provided at the local device is valid within the remote target environment. Advantages of this approach can be seen with reference to the three examples given above. Even if the user ID and password pass local syntactical checking, it may still happen that this user should be prevented from installing software on the target machine. For example, the user having this ID/password might be already logged on to another application on the target machine. The drive letter for the target directory might be invalid for downloading the installation package to this device. (For example, the installer might select the "E" drive, expecting that a writable CD is available in that drive. If the drive is not configured as a writable device, however, then the download operation will fail.) Or, the selected drive might not have sufficient space for storing the installation package. The port number, even if it is a syntactically valid port number, might be in use on the remote system which would prevent the software application from functioning once it has been installed. These scenarios are examples of problems that are only detectable in the context of the target device or target environment, and the prior art approach of analyzing the user input on the local staging server will not detect problems of this type.

In the prior art, after evaluating the user input in terms of locally-available constraints and generic requirements, the installation image is built and transferred over the network to the remote target device. Then installation program is then executed at the remote device. However, if the locally-performed validation fails to detect a problem such as those described above, then the installation operation will fail, or the installed software will be configured in an unusable state. This can prove to be a tedious, time-consuming process, which may waste considerable system resources (such as network bandwidth and storage) and impair the productivity of the personnel who are attempting the installation or prohibit the intended users of the software from being able to use it.

Using the techniques of the present invention, on the other hand, provides for immediate feedback regarding the validity of user input data in the specific context of the remote target device. Installations are therefore smoother and more efficient, and a more pleasant experience for the installer/system administrator. The approach disclosed herein prevents unnecessarily transmitting a potentially large installation image over the network to the remote target device. For example, if the user enters a port number that is already in use on the target machine, the remote validation will detect this problem and allow immediately issuing an error message on the input GUI. The installer can then select a different port number, and the proper functioning of the installed software can be ensured. Building (and subsequent transmission) of the install image can be delayed until such configuration parameters have been remotely validated.

The conditional installation invention discloses using the install entity as described by the related inventions, and conditionally distributing and executing the installation image based on outcome of an incremental routine of the install package which is executed before downloading and executing the subsequent dependent routines of the total install package. As an example, in the case of a remote installation, the conditional installation invention discloses that a small prerequisite routine may be dispatched over a network connection from the total install package (rather than sending the entire install package). This dispatched routine may then be executed on the remote machine, and based on its outcome, a return code may be transmitted from the remote machine to indicate whether subsequent routines from the install package should be retrieved and executed.

The conditional installation invention addresses the distribution and installation of a software package. The present invention, in contrast, provides for efficiently creating installation packages prior to distribution and installation. Note that both inventions may achieve similar advantages, such as efficient utilization of processor cycles, disk space, and resources including the installer's time, as well as efficient utilization of network bandwidth. However, the two inventions define distinct techniques and pertain to different phases of the software installation process. Furthermore, the present invention also addresses the proper functioning of the installed software.

Figure 3:
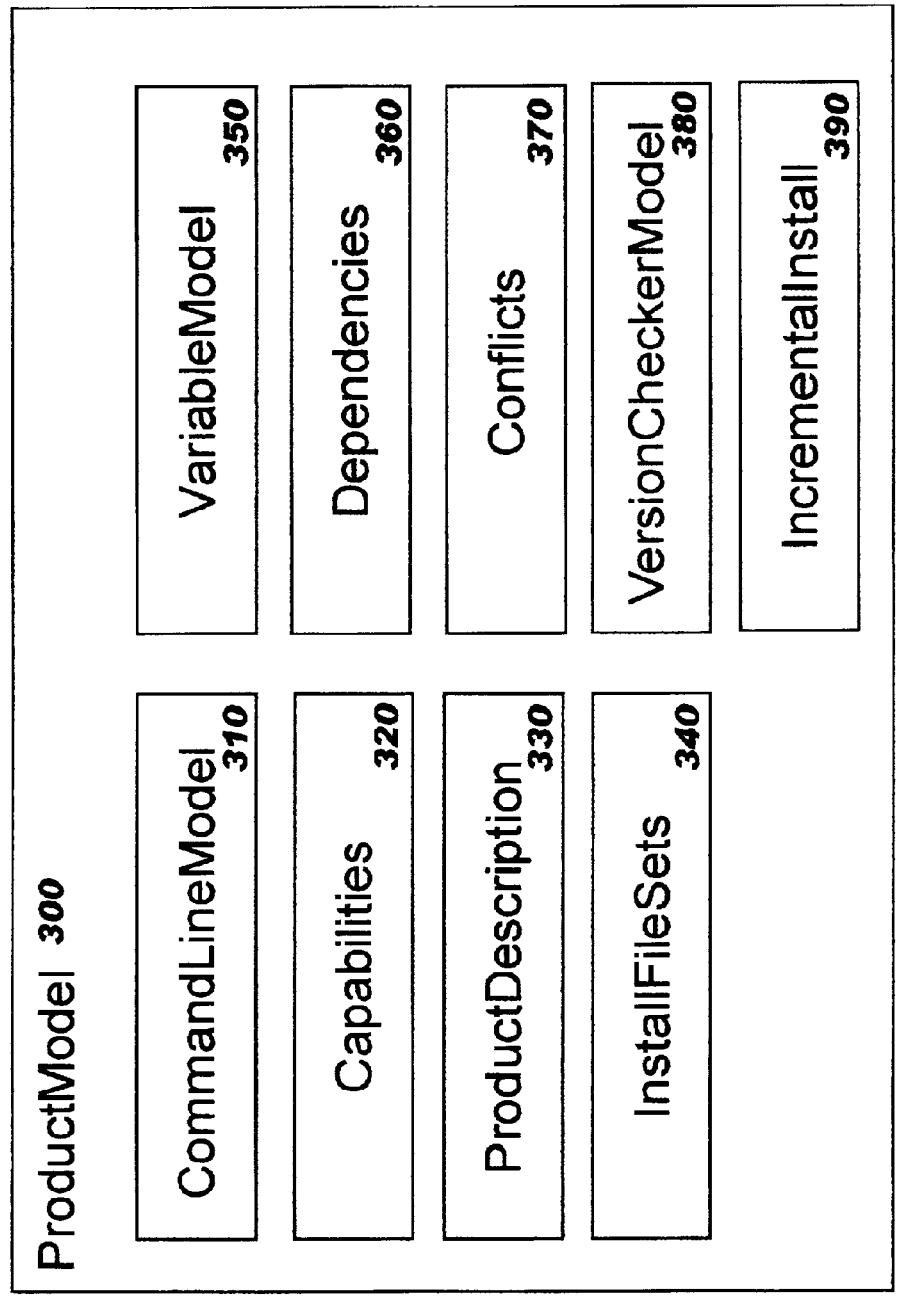
FIG. 3 illustrates an object model that may be used for defining software components to be included in an installation package, according to the related inventions, and which may be leveraged by the present invention.
Figure 4:
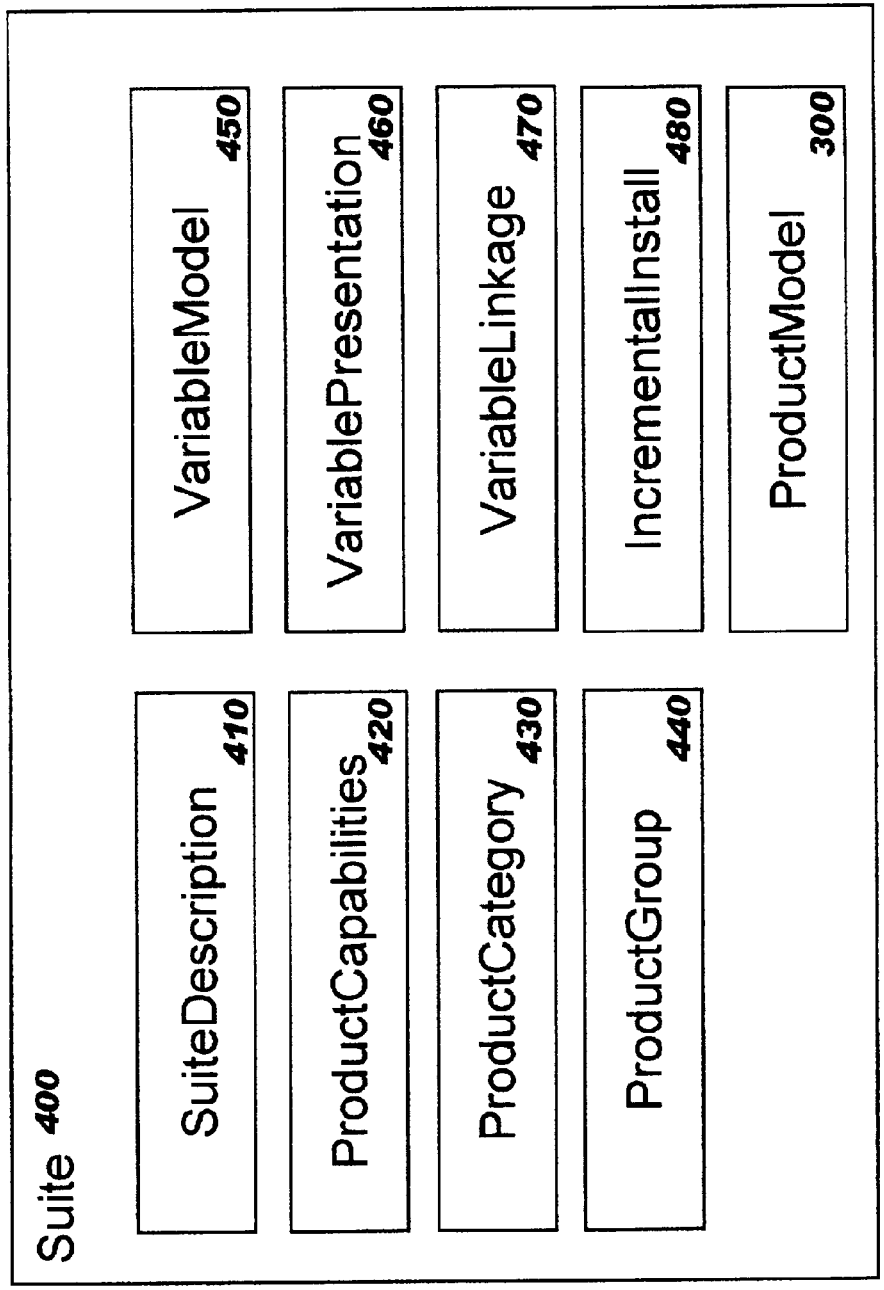
FIG. 4 depicts an object model that may be used for defining a suite, or package, of software components to be installed, according to the related inventions, and which may be leveraged by the present invention.

A preferred embodiment of the object model used for defining installation packages as disclosed in the related inventions is depicted in FIGS. 3 and 4. FIG. 3 illustrates a preferred object model to be used for describing each software component present in an installation package. A graphical containment relationship is illustrated, in which (for example) ProductModel 300 is preferably a parent of one or more instances of CommandLineModel 310, Capabilities 320, etc. FIG. 4 illustrates a preferred object model that may be used for describing a suite comprising all the components present in a particular installation package. (It should be noted, however, that the model depicted in FIGS. 3 and 4 is merely illustrative of one structure that may be used to represent installation packages according to the present invention. Other subclasses may be used alternatively, and the hierarchical relationships among the subclasses may be altered, without deviating from the inventive concepts disclosed herein.) A version of the object model depicted by FIGS. 3 and 4 has been described in detail in the related inventions. This description is presented here as well in order to establish a context for the present invention. The manner in which this object model that may be used for supporting the present invention is also described herein in context of the overall model.

Note that each of the related inventions may differ slightly in the terms used to describe the object model and the manner in which it is processed. For example, the related invention pertaining to use of structured documents refers to elements and subelements, and storing information in document form, whereas the related invention pertaining to use of JavaBeans refers to classes and subclasses, and storing information in resource bundles. As another example, the related inventions disclose several alternative techniques for specifying information for installation objects, including: use of resource bundles when using JavaBeans; use of structured documents encoded in a notation such as the Managed Object Format ("MOF") or XML; and use of properties sheets. These differences will be well understood by one of skill in the art. For ease of reference when describing the present invention, the discussion herein is aligned with the terminology used in the JavaBeans-based disclosure; it will be obvious to those of skill in the art how this description may be adapted in terms of the other related inventions.

A ProductModel 300 object class is defined, according to the related inventions, which serves as a container for all information relevant to the installation of a particular software component. The contained information is shown generally at 310 through 380, and comprises the information for a particular component installation, as will now be described in more detail. CommandLineModel class 310 is used for specifying information about how to invoke an installation (i.e. the "command line" information, which includes the command name and any arguments). In preferred embodiments of the object model disclosed in the related inventions, CommandLineModel is an abstract class, and has subclasses for particular types of installation environments. These subclasses preferably understand, inter alia, how to install certain installation utilities or tools. For example, if an installation tool "ABC" is to be supported for a particular installation package, an ABCCommandLine subclass may be defined. Instances of this class then provide information specific to the needs of the ABC tool. A variety of installation tools may be supported for each installation package by defining and populating multiple such classes.

Preferably, instances of these classes reference a resource or resource bundle which specifies the syntax of the command line invocation. (Alternatively, the information may be stored directly in the instance.)

Instances of the CommandLineModel class 310 preferably also specify the response file information (or a reference thereto), enabling automated access to default response values during the installation process. In addition, these instances preferably specify how to obtain information about the success or failure of an installation process. This information may comprise identification of particular success and/or failure return codes, or the location (e.g. name and path) of a log file where messages are logged during an installation. In the latter case, one or more textual strings or other values which are designed to be written into the log file to signify whether the installation succeeded or failed are preferably specified as well. These string or other values can then be compared to the actual log file contents to determine whether a successful installation has occurred. For example, when an installation package is designed to install a number of software components in succession, it may be necessary to terminate the installation if a failure is encountered for any particular component. The installation engine of the present invention may therefore automatically determine whether each component successfully installed before proceeding to the next component.

Additional information may be specified in instances of CommandLineModel, such as timer-related information to be used for monitoring the installation process. In particular, a timeout value may be deemed useful for determining when the installation process should be considered as having timed out, and should therefore be terminated. One or more timer values may also be specified that will be used to determine such things as when to check log files for success or failure of particular interim steps in the installation.

Instances of a Capabilities class 320 are used to specify the capabilities or functions a software component provides. Capabilities thus defined may be used to help an installer select among components provided in an installation package, and/or may be used to programmatically enforce install-time checking of variable dependencies. As an example of the former, suppose an installation package includes a number of printer driver software modules. The installer may be prompted to choose one of these printer drivers at installation time, where the capabilities can be interrogated to provide meaningful information to display to the installer on a selection panel. As an example of the latter, suppose Product A is being installed, and that Product A requires installation of Function X. The installation package may contain software for Product B and Product C, each of which provides Function X. Capabilities are preferably used to specify the functions provided by Product B and Product C (and Dependencies class 360, discussed below, is preferably used to specify the functions required by Product A). The installation engine can then use this information to ensure that either Product B or Product C will be installed along with Product A.

As disclosed in the related inventions, ProductDescription class 330 is preferably designed as a container for various types of product information. Examples of this product information include the software vendor, application name, and software version of the software component. Instances of this class are preferably operating-system specific. The locations of icons, sound and video files, and other media files to be used by the product (during the installation process, and/or at run-time) may be specified in instances of ProductDescription. For licensed software, instances of this class may include licensing information such as the licensing terms and the procedures to be followed for registering the license holder. When an installation package provides support for multiple natural languages, instances of ProductDescription may be used to externalize the translatable product content (that is, the translatable information used during the installation and/or at run-time). This information is preferably stored in a resource bundle (or other type of external file or document, referred to herein as a resource bundle for ease of reference) rather than in an object instance, and will be read from the resource bundle on an on-demand basis.

The InstallFileSets class 340 is used in preferred embodiments of the object model disclosed in the related inventions as a container for information that relates to the media image of a software component. Instances of this class are preferably used to specify the manifest for a particular component. Tens or even hundreds of file names may be included in the manifest for installation of a complex software component. Resource bundles are preferably used, rather than storing the information directly in the object instance.

The related inventions disclose use of the VariableModel class 350 as a container for attributes of variables used by the component being installed. For example, if a user identifier or password must be provided during the installation process, the syntactical requirements of that information (such as a default value, if appropriate; a minimum and maximum length; a specification of invalid characters or character strings; etc.) may be defined for the installation engine using an instance of VariableModel class. In addition, custom or product-specific validation methods may be used to perform more detailed syntactical and semantic checks on values that are supplied (for example, by the installer) during the installation process. (Note that these validation methods, being part of the Product Model 300, form part of the install image itself and are designed for use during the installation process. Thus, these are not the remote validation methods disclosed by the present invention. The remote validation methods of the present invention execute on the remote system, prior to building the install image, and thus are decoupled from ProductModel 300.) As disclosed for an embodiment of the related inventions, this validation support may be provided by defining a CustomValidator abstract class as a subclass of VariableModel, where CustomValidator then has subclasses for particular types of installation variables. Examples of subclasses that may be useful include StringVariableModel, for use with strings; BooleanVariableModel, for use with Boolean input values; PasswordVariableModel, for handling particular password entry requirements; and so forth. Preferably, instances of these classes use a resource bundle that specifies the information (including labels, tooltip information, etc.) to be used on the user interface panel with which the installer will enter a value or values for the variable information.

Dependencies class 360 is used to specify prerequisites and co-requisites for the installation package, as disclosed in the related inventions. Information specified as instances of this class, along with instances of the Capabilities class 320, is used at install time to ensure that the proper software components or functions are available when the installation completes successfully.

The related inventions disclose providing a Conflicts class 370 as a mechanism to prevent conflicting software components from being installed on a target device. For example, an instance of Conflicts class for Product A may specify that Product Q conflicts with Product A. Thus, if Product A is being installed, the installation engine will determine whether Product Q is installed (or is selected to be installed), and generate an error if so.

VersionCheckerModel class 380 is provided to enable checking whether the versions of software components are proper, as disclosed in the related inventions. For example, a software component to be installed may require a particular version of another component.

The conditional installation invention defines an additional class, IncrementalInstall 390. As disclosed in this conditional installation invention, IncrementalInstall 390 is a subclass of ProductModel 300 and may be used to provide a conditional distribution and installation of the corresponding software component. (Alternatively, this information may be represented within one or more of the previously-defined classes.)

Because the conditional installation invention is distinct from the present invention, it will not be described in detail herein. Refer to the conditional installation patent for more information.

Preferably, the resource bundles referenced by the software components of the present invention are structured as product resource bundles and variable resource bundles. Examples of the information that may be specified in product resource bundles (comprising values to be used by instances of CommandLineModel 310, etc.) and in variable resource bundles (with values to be used by instances of VariableModel 350, ProductDescription 330, etc.) are depicted in FIGS. 5 and 6, respectively. (Note that while 2 resource bundles are shown for the preferred embodiment, this is for purposes of illustration only. The information in the bundles may be organized in many different ways, including use of a separate bundle for each class. When information contained in the bundles is to be translated into multiple natural languages, however, it may be preferable to limit the number of such bundles.)

Referring now to FIG. 4, an object model as disclosed in the related inventions for representing an installation suite comprising all the components present in a particular installation package will now be described. A Suite 400 object class serves as a container of containers, with each instance containing a number of suite-level specifications in subclasses shown generally at 410 through 470. Each suite object also contains one or more instances of ProductModel 300 class, one instance for each software component in the suite. The Suite class may be used to enforce consistency among software components (by handling the inter-component prerequisites and co-requisites), and to enable sharing of configuration variables among components. (Furthermore, as disclosed in the conditional installation invention, the Suite class 400 may contain suite-level information to be used in a conditional installation, as described therein.)

SuiteDescription class 410 is defined in the related inventions as a descriptive object which may be used as a key when multiple suites are available for installation. Instances of SuiteDescription preferably contain all of the information about a suite that will be made available to the installer. These instances may also provide features to customize the user interface, such as build boards, sound files, and splash screens.

As disclosed in the related inventions, ProductCapabilities class 420 provides similar information as Capabilities class 320, and may be used to indicate required or provided capabilities of the installation suite.

ProductCategory class 430 is defined in the related inventions for organizing software components (e.g. by function, by marketing sector, etc.). Instances of ProductCategory are preferably descriptive, rather than functional, and are used to organize the display of information to an installer in a meaningful way. A component may belong to multiple categories at once (in the same or different installation suites).

As disclosed in the related inventions, instances of ProductGroup class 440 are preferably used to bundle software components together for installation. Like an instance of ProductCategory 430, an instance of ProductGroup groups products; unlike an instance of ProductCategory, it then forces the selection (that is, the retrieval and assembly from the directory) of all software components at installation time when one of the components in the group (or an icon representing the group) is selected. The components in a group are selected when the suite is defined, to ensure their consistency as an installation group.

Instances of VariableModel class 450 provide similar information as VariableModel class 350, as discussed in the related inventions, and may be used to specify attributes of variables which pertain to the installation suite.

VariablePresentation class 460 is used, according to the related inventions, to control the user interface displayed to the installer when configuring or customizing an installation package. One instance of this class is preferably associated with each instance of VariableModel class 450. The rules in the VariableModel instance are used to validate the input responses, and these validated responses are then transmitted to each of the listening instances of VariableLinkage class 470.

As discussed above with reference to VariableModel class 350, the rules described in the related inventions form part of the installation image, and pertain to locally-performed validation using locally-available information. This is distinct from the present invention, which discloses remote validation of information used to build an installation image, using validation logic which resides on device(s) in the target environment.

As disclosed in the related inventions, instances of VariableLinkage class 470 hold values used by instances of VariableModel class 450, thereby enabling sharing of data values. VariableLinkage instances also preferably know how to translate information from a particular VariableModel such that it meets the requirements of a particular ProductModel 300 instance.

The conditional installation invention defines an IncrementalInstall class 480 that may be provided for use in a conditional installation that pertains to the entire suite. (Suite-level conditional installation information may alternatively be represented in one or more of the existing classes.) If an implementation of the conditional installation invention chooses not to support conditional installation at the suite level, then this class 480 is omitted. The suite-level IncrementalInstall class 480 is similar to the component-level IncrementalInstall class 390 which was previously described. As an example of suite-level checking, code may be performed to detect the type of target device and to suppress distribution and installation of large installation images in certain cases, based upon that information (e.g. for constrained devices such as PDAs or devices that connect to a network using a relatively expensive wireless connection).

Each instance of ProductModel class 300 in a suite is preferably independently serializable, as discussed in the related inventions, and is merged with other such assembled or retrieved instances comprising an instance of Suite 400. The techniques of the present invention are preferably used during that merge, or build process, such that the resulting Suite 400 instance is configured using data which has already been validated in the context of the remote target environment.

During the customization process, an installer may select a number of physical devices or machines on which software is to be installed from a particular installation package. Furthermore, he may select to install individual ones of the software components provided in the package. This is facilitated by defining a high-level object class (not shown in FIGS. 3 or 4) which is referred to herein as "Groups", which is a container for one or more Group objects. A Group object may contain a number of Machine objects and a number of ProductModel objects (where the ProductModel objects describe the software to be installed on those machines, according to the description of FIGS. 3 and 4). Machine objects preferably contain information for each physical machine on which the software is to be installed, such as the machine's Internet Protocol (IP) address and optionally information (such as text for an icon label) that may be used to identify this machine on a user interface panel when displaying the installation package information to the installer. (When using the present invention, machine-specific port numbers are one example of the type of data that can be remotely validated before building the install image.)

When using JavaBeans of the Java programming language to implement installation objects according to the installation object model, the object attributes and methods to be used for installing a software package are preferably specified as properties and methods of the JavaBeans. A JavaBean is preferably created for each software component to be included in a particular software installation package, as well as another JavaBean for the overall installation suite. When using Object REXX, the object attributes and methods to be used for installing a software package are preferably specified as properties and methods in Object REXX. When using structured documents, the object attributes and methods are preferably specified as elements in the structured documents. (Refer to the related inventions for a detailed discussion of these approaches.)

The process of remotely validating user input, in preparation for using that input when building the component (i.e. ProductModel) objects and Suite object once the remote validation succeeds, will now be described with reference to the flowchart in FIG. 7. (The related inventions have disclosed a general software installation process using the model and framework of their respective FIGS. 3 and 4, and preferred embodiments of logic which may be used to implement this installation process have been described therein with reference to their respective FIGS. 7 through 10. Refer to those related inventions for a description of processing that occurs to distribute and install an installation package.) FIG. 8 is then described, further illustrating how this process occurs through use of an example.

At Block 700, the user at a staging server selects to perform a "push" installation of a software package that requires some type of user input for building the installation image. Examples of this user input have been discussed previously, and include user IDs, passwords, target directories, and port numbers. The user then selects the target system to which the installation image is to be pushed (Block 710). Input for one or more configuration parameters is obtained from the user (Block 720), preferably through a GUI. Block 730 then passes those values to the remote target system.

According to preferred embodiments of the present invention, an installation agent or analogous software routine is resident on the remote target system, and is adapted to receiving the staging server's message(s) and invoking the appropriate validation. Preferably, this installation agent is adapted for parsing an incoming message to determine the parameters for which values are being provided, and has mapping information that specifies the corresponding validation routine for each such parameter value. (The parameter values are preferably encoded as elements and/or attributes of the message.) As desired for a particular implementation, a single validation routine may encompass logic for validating multiple parameter values, or separate parameter-specific routines may be used. (Subsequent discussions assume, for purposes of illustration, that separate routines are used.) The messages exchanged between the staging server and installation agent are preferably encoded in a structured markup language, such as XML, and may be defined according to a schema or Document Type Definition ("DTD"). Details of schema definitions and DTDs are well known to those of skill in the art, and will not be described in detail herein. A protocol such as Java RMI or CORBA is preferably used for transmitting the messages between the staging server and installation agent.

The validation routine(s) corresponding to the transmitted configuration parameter(s) is/are executed on the target system once the parameter values have been received (Block 740), and return code information is sent back to the staging server (Block 750). The form of this return code information may vary from one implementation of the present invention to another; what is required is that the information is sent in a format for which the implementation is adapted to process. Block 760 tests to see if the return code information indicates a successful validation. If so, then the processing in Block 770 is performed to confirm the validity to the user (although this positive confirmation may optionally be omitted), and then proceed with creating the installation image. This installation image may then be installed, using (for example) techniques which have been described in the related inventions. If the test in Block 760 indicates that one or more of the configuration parameters failed the remote validation, then an error message is preferably displayed, and the sequence of obtaining data values, passing them to the remote system, performing the remote validation, and transmitting return code information to the staging server is repeated, as indicated by Block 780.

According to preferred embodiments, the parameters that have been remotely validated will be used as values that are encoded in the installation image being built.

Note that an iteration of the processing in FIG. 7 may be used for obtaining and remotely validating all of the configuration values for a suite, or for selected portions thereof.

Referring now to FIG. 8, sample structured markup language syntax is provided to further illustrate operation of the present invention. A partial structured document 800 is illustrated, showing definitional statements for three string variables and one password variable. In this example, the definitional statements pertain to installation of an IBM HTTP Server ("IHS"). The string variable named "IBMHTTPW32win_prod_path" represents the installation path to be used when installing this package in a particular environment. (See element 810.) The string variable named "IHS_SERVER_USERID" represents the user ID to be used when installing this package, and the password variable named "IHS_SERVER_PASSWORD" represents the password for that user ID. (See elements 820 and 830.) The string variable named "IHS_PORT_NUMBER" represents the installation port number to be used when installing the package. (See element 840.)

A limited amount of local validation is specified in the markup syntax for these four items, using prior art techniques. For example, the value provided for the product installation path must be at least 4 characters in length, as specified at 811, and the port number must be at least 1 character but not more than 5 characters in length, as specified at 841. Length restrictions for the user ID and password, along with attributes pertaining to case-sensitivity, are specified at 821 and 831. These local validations will typically be performed at the time when a value of the respective configuration parameter is being provided through the GUI, giving the user immediate feedback about syntactically acceptable values.

The <validator> element 812 identifies a location of a validation routine that may be used for performing validation related to the product path. This is an example of the type of validation method discussed in the related inventions, which operates on the local system to ensure the correctness and internal consistency of a customization and/or of the response values that are otherwise provided during an installation. Syntax which limits the port number to digits in the range (1 to 65535) is specified at 842. This validation can also be performed locally, but does not detect context-specific problems such as the port number being unavailable on the target system, as has been discussed previously.

In this example markup syntax 800, a <remoteValidation> element 850 designates the values which are subject to remote validation. In this example, three of the four defined parameters are to be validated. The <portNumber> element 851 has as its value the name of the string variable 840 which stores the port number, indicating that the port number is to be remotely validated. Similarly, the values of the <prodPath> element 852 and <userID> element 853 indicate that the values of the product path and user ID are to be remotely validated. This markup syntax is preferably part of the installation package created according to the object model described above with reference to FIGS. 3 and 4.

As has been demonstrated, the present invention defines techniques for remotely validating installation data before building an installation suite reflecting that data. Preferred embodiments leverage an object model and framework that provide a standard, consistent approach to software installation across many variable factors such as product and vendor boundaries, computing environment platforms, and the language of the underlying code as well as the preferred natural language of the installer, as was disclosed in the related inventions. An implementation of the present invention may include the teachings of one or more of these related inventions. In alternative embodiments, the techniques disclosed herein may be used to remotely validate configuration parameters that are to be used when building an installation image according to a model other than that disclosed in the related inventions. Use of the techniques disclosed herein provides for efficient, accurate creation of an installation package.

The related invention titled "Self-Contained Validation of Data Model Object Content" discloses techniques for validating data by coupling validation rules to the data, enabling the rules to easily and consistently be transmitted along with the data. This related invention does not disclose techniques for remotely validating configuration parameters as a precondition to building an installation image, which is taught by the present invention. The present invention may also be used in conjunction with an implementation of the self-contained validation invention.

While preferred embodiments of the present invention have been described, additional variations and modifications in that embodiment may occur to those skilled in the art once they learn of the basic inventive concepts. Therefore, it is intended that the appended claims shall be construed to include preferred embodiments as well as all such variations and modifications as fall within the spirit and scope of the invention.

What is claimed is:

1. A method of improving installation of software packages, comprising steps of:
   obtaining, at an installation package building server, input values corresponding to one or more installation parameters of an installation package to be installed at a target system that is located remotely from the server;
   determining, at the server, one or more of the installation parameters which are subject to remote validation;
   transmitting the obtained input values corresponding to the determined installation parameters from the sever to the remotely-located target system for performing the remote validation; and
   using a result of the remote validation when building the installation package at the server.

2. The method according to claim 1, wherein the determining step further comprises the step of consulting a specification of which of the installation parameters are subject to remote validation.

3. The method according to claim 2, wherein the specification is encoded in a structured markup language.

4. The method according to claim 3, wherein the structured markup language is Extensible Markup Language ("XML") or a derivative thereof.

5. The method according to claim 2, wherein the specification is put of an installation object defined for the installation package.

6. The method according to claim 1, further comprising the steps of:
   receiving, at the remotely-located target system, the transmitted input values;
   performing at the remotely-located target system, the remote validation of the received input values; and
   returning the result of the remote validation from the remotely-located target system to the server.

7. The method according to claim 6, wherein the performing step further comprises the step of identifying one or more remote validation routines corresponding to the received input values.

8. The method according to claim 7, wherein the identifying step is performed by an installation agent resident on the remotely-located target system.

9. The method according to claim 1, wherein the transmitted input parameters are encoded in a structured markup language.

10. The method according to claim 1, wherein the result of the remote validation is encoded in a structured markup language.

11. The method according to claim 1, wherein the using step further comprise the steps of:
    building the installation package if the result if positive; and
    repeating operation of the obtaining, transmitting and using steps otherwise.

12. The method according to claim 1, wherein carrying out the remote validation at the remotely-located target system enables performing the validation in context.

13. The method according to claim 1, wherein the remote validation uses information that is locally-available on the remotely-located target system.

14. The method according to claim 11, further comprising the step of transmitting the built installation package to the remotely-located target system.

15. The method according to claim 14, further comprising the steps of:
    receiving the transmitted installation package at the remotely-located target system; and
    installing the received installation package at the target system.

16. The method according to claim 11, wherein the using step further comprises the step of reflecting at least one of the obtained input values in the built installation package.

17. A system for improving installation of software packages, comprising:
    means for obtaining, at an installation package building server, input values corresponding to one or more installation parameters of an installation package to be installed at a target system that is located remotely from the server;
    means for determining, at the server, one or more of the installation parameters which should be remotely validated;
    means for transmitting the obtained input values corresponding to the determined installation parameters from the server to the remotely-located target system for performing the remote validation; and
    means for using a result of the remote validation when building the installation package at the server.

18. The system according to claim 17, wherein the means for determining further comprises means for consulting a specification of which of the installation parameters are subject to remote validation, wherein the specification is encoded in a structured markup language.

19. The system according to claim 17, wherein the specification is part of an installation object defined for the installation package.

20. The system according to claim 17, further comprising:
    means for receiving, at the remotely-located target system, the transmitted input values;
    means for performing, at the remotely-located system, the remote validation of the received input values; and
    means for returning the result of the remote validation from the remotely-located target system to the server.

21. The system according to claim 20, wherein the means for performing further comprises means for identifying a validation routine corresponding to the received input values.

22. The system according to claim 21, wherein the means for identifying is performed by an installation agent resident on the remotely-located target system.

23. The system according to claim 17, wherein the transmitted input parameters are encoded in a first structured markup language document and the result of the remote validation is encoded in a second structured markup language document.

24. The system according to claim 17, wherein the means for using further comprises means for building the installation package only if the result indicates a successful validation at the remotely-located target system, and wherein at least one of the obtained input values is reflected in the built installation package.

25. The system according to claim 17, wherein carrying out the remote validation at the remotely-located target system enables performing the validation in context using information that is locally-available on the remotely-located target system.

26. A computer program product for improving installation of software packages, the computer program product embodied on one or more computer-readable media and comprising:

computer-readable program code means for obtaining, at an installation image building server, input values corresponding to installation parameters for an installation image to be installed at a target system that is located remotely from the server;

computer-readable program code means for determining, at the saver, one or more of the installation parameters which are subject to remote validation;

computer-readable program code means for transmitting the obtained input values corresponding to the determined installation parameters to from the server to the remotely-located target system for performing the remote validation; and computer-readable program code means for using a result of the remote validation when building the installation image at the server.

27. The computer program product according to claim 26, wherein the computer-readable program code means for determining further comprises computer-readable program code means for consulting a specification of which of the installation parameters are subject to remote validation, wherein the specification is part of an installation object defined for the installation image.

28. The computer program product according to claim 26, further comprising:

computer-readable program code means for receiving, by an installation agent resident at the remotely-located target system, the transmitted input values;

computer-readable program code means for performing, at the remotely-located target system, the remote validation of the received input values using a remote validation routine corresponding to each of the received input values; and computer-readable program code means for returning the result of the remote validation from the remotely-located target system to the server.

29. The computer program product according to claim 26, wherein the transmitted input parameters and the result of the remote validation are encoded in a structured markup language.

30. The computer program product according to claim 26, wherein the computer-readable program code means for using further comprises:

computer-readable program code means for analyzing the result, at the server, to determine whether the remote validation had a successful outcome; and computer-readable program code means for building the installation image when the computer-readable program code means for analyzing detects the successful outcome, wherein the built installation image reflects one or more of the obtained input values.

* * * * *

UNITED STATES PATENT AND TRADEMARK OFFICE
CERTIFICATE OF CORRECTION

PATENT NO. : 6,954,930 B2
DATED : October 11, 2005
INVENTOR(S) : Daniel R. Drake et al.

It is certified that error appears in the above-identified patent and that said Letters Patent is hereby corrected as shown below:

Column 19,
Line 30, change "is put of" to -- is part of --.
Line 36, change "performing at" to -- performing, at --.

Column 21,
Line 7, change "the saver, one" to -- the server, one --.
Line 11, change "parameters to from the server" to -- parameters from the server --.

Signed and Sealed this

Eighteenth Day of April, 2006

JON W. DUDAS
*Director of the United States Patent and Trademark Office*